United States Patent Office 3,072,703
Patented Jan. 8, 1963

3,072,703
PREPARATION OF ORGANO AND INORGANO PHOSPHORUS COMPLEXES SUITABLE FOR SULFATING AND SULFONATING ORGANIC COMPOUNDS
Albin F. Turbak, New Providence, N.J., assignor to Esso Research and Engineering Company, a corporation of Delaware
No Drawing. Filed Apr. 1, 1959, Ser. No. 803,355
24 Claims. (Cl. 260—461)

The present invention relates to compositions which are capable of sulfating and sulfonating organic compounds. Specifically, it concerns the combination of a sulfur trioxide-containing substance with a polyvalent phosphorus compound to form a novel composition of matter which permits controlled sulfating and sulfonating of organic compounds.

The common sulfating and sulfonating agents, such as sulfur trioxide and chlorosulfonic acid, are difficult to work with because of their high reactivity with organic compounds. Thus, the conditions must be stringently controlled in order to avoid charring and the formation of undesirable by-products. Much work has been undertaken in an effort to find a substance which will permit these reactions to take place at room temperature without the attending charring and side reactions which normally take place at this temperature with either of the aforementioned agents.

It has now been discovered that organic compounds can be sulfated and sulfonated at higher temperatures by combining a substance containing available sulfur trioxide with a trivalent or pentavalent phosphorus compound. The complex which is formed by the reaction between the sulfur trioxide and the phosphorus compound will sulfate and sulfonate at temperatures up to 100° C. without producing char in the product, or forming undesirable by-products such as, for example, sulfone linkages or color bodies.

In carrying out the present invention at least 1 mole of available sulfur trioxide is contacted with 1 mole of a trivalent or pentavalent phosphorus compound in the presence or absence of an organic solvent. Because the reaction is exothermic, it is advisable to have a substantial amount of solvent present when the reactants are contacted in order to assist in the dissipation of the heat of reaction. Various solvents may be used, including such things as carbon tetrachloride, chloroform, sulfur dioxide, carbon bisulfide, sym-tetrachloroethane and ethylene dichloride. Any solvent may be used which is inert and capable of dissolving both of the reactants as well as the complexed product. It should not react with either of the reactants or the complexed product so as to interfere with the use of the product as a sulfating or sulfonating agent. The reactants may be contacted with each other at a temperature of —20 to 100° C. at pressures ranging up to 20 atmospheres or more for from 1 second to 1 hour. While the aforementioned conditions are suitable for the preparation of the complex, the reaction is must favorably carried out at a temperature of —5° to +40° C. under atmospheric pressure. When the reactants are admixed with adequate agitation, such as that obtained with an efficient stirrer, the reaction is almost instantaneous and therefore the time is principally dependent upon the rate of addition of the sulfur trioxide substance to the phosphorus compound. Because the reaction is accompanied by a rise in temperature in the reaction zone, it may be desirable in some instances to employ either an internal cooling system, e.g. recycling, or an external coolant in a jacket. The amount of solvent employed to facilitate the reaction and assist in the dissipation of heat will depend to a large extent on the reaction temperature. For instance at very low temperatures the inert organic solvent may contain up to 95 wt. percent of reactants while at temperatures approximating that of the room the solvent may contain as little as 0.1 or 0.5 wt. percent reactants. It is preferred to use a low boiling solvent which can be easily distilled from the reaction product at a temperature below 45° C. under 5–20 mm. of mercury absolute pressure.

Depending upon the amount of available sulfur trioxide reacted with the phosphorus compound, the resulting combination or complex will either sulfonate or sulfate aromatic, olefinic or carbanion systems. If the complex is to be employed as a sulfating agent, the mole ratio of available sulfur trioxide to phosphorus compound should be approximately 1:1; under these conditions, aromatic systems will be unreactive but olefinic and active H systems will react.

For aromatic sulfonation reactions, the mole ratio of available sulfur trioxide to phosphorus compound should be more than 1:1, but the amount of sulfur trioxide should not be more than enough to completely combine with the phosphorus compound. Since up to 2 moles of sulfur trioxide may combine with each ester type oxygen, e.g. alkoxy oxygen, in the phosphorus compound, the number of moles of available sulfur trioxide which may be employed per mole of phosphorus compound may be as high as 7 or more, depending upon the phosphorus compound as well as the number of moles of available sulfur trioxide which will react with the phosphoryl oxygen or free electron pair in the phosphorus compound. For most purposes the mole ratio of available sulfur trioxide to phosphorus compound should be about 2 to 4:1. This range of molar ratios is especially desirable where the sulfonating complex contains a tertiary organic trivalent or pentavalent phosphorus compound.

While the phosphorus compound may be either inorganic or organic, it is preferred to use an organic phosphorus compound containing either of the following functional groups:

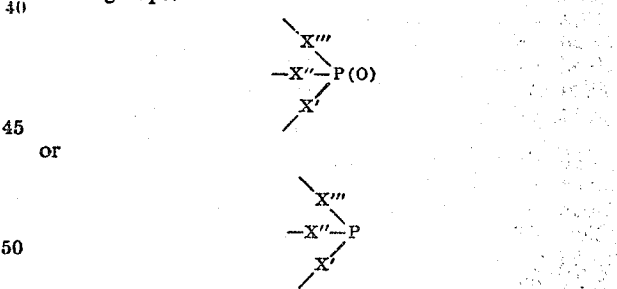

in which X′, X″ and X‴ are either oxygen or carbon and need not necessarily be the same, O is oxygen and P is phosphorus. For aromatic sulfonation, at least one of the "X" atoms must be oxygen. Various organic phosphite, phosphinite, phosphinate, phosphate, phosphonate, phosphonite and phosphine compounds may be employed to prepare the complexed product. The compounds may contain from 0–3 ester oxygens which may have alkyl, aryl, alkaryl or aralkyl groups attached to them containing 1–18 carbon atoms. Similar organic groups may be attached to the phosphorus directly as indicated above when "X" is carbon. These organic groups should be relatively nonreactive, especially with the available sulfur trioxide used to form the complex. If a reaction does occur between the sulfur trioxide and the organic group attached to the phosphorus, it will be necessary to use additional sulfur trioxide to compensate for this loss. Complexes containing inorganic acids such as phosphoric acid, phosphorus acid, pyrophosphoric acid, metaphosphoric acid, phosphonic acid and phosphinic acid are suitable as sulfating agents. In addition to the acids their mono-, di- and tri-substituted derivatives may also be employed. However, the preferred phosphorus compounds are the trialkyl phosphates and phosphites.

Among the organic phosphorus compounds which may be employed to prepare the complexes are:

Triethyl phosphate, trimethyl phosphate, tripropyl phosphite, tri-butyl phosphate, triethyl phosphite, trimethyl phosphite, tripropyl phosphite, tri-butyl phosphite, diethyl hydrogen phosphate, dimethyl hydrogen phosphate, diethyl hydrogen phosphite, dimethyl hydrogen phosphite, ethyl dihydrogen phosphate, methyl dihydrogen phosphate, ethyl dihydrogen phosphite, methyl dihydrogen phosphite, tris (2,4-dichlorophenyl) phosphate, tris (2,4-dichlorophenyl) phosphite, bis (2,4-dichlorophenyl) hydrogen phosphate, bis (2,4-dichlorophenyl) hydrogen phosphite, tris (p-nitrophenyl) phosphate, tris (p-nitrophenyl) phosphite, bis (p-nitrophenyl) hydrogen phosphate, bis (p-nitrophenyl) hydrogen phosphite, tris (p-sulfophenyl) phosphate, tris (p-sulfophenyl) phosphite, 2,4-dichlorophenyl dihydrogen phosphate, 2,4-dichlorophenyl dihydrogen phosphite, tetraethyl pyrophosphate, tetramethyl pyrophosphate, dimethyl diethyl pyrophosphate, ethyl metaphosphate, bis (2,4-dichlorophenyl) diethyl pyrophosphate, sym-p-nitrophenyl pyrophosphate, p-nitrophenyl metaphosphate, tris (B-chloroethyl) phosphate, tetra (B-chloroethyl) pyrophosphate, diethyl dihydrogen pyrophosphate, di (2,4 dichlorophenyl) dihydrogen pyrophosphate, tris (2,4,6 trimethylphenyl) phosphate and tris (3,4,6 trimethylbenzyl) phosphate. Where pyrophosphates are employed, as many as 12 moles of available sulfur trioxide may be complexed with each mole of phosphorus compound.

By the term "available sulfur trioxide" is meant not only sulfur trioxide itself but also those substances which contain sulfur trioxide in a loosely bound form which it can be readily liberated when treated with the phosphorus compound. Fuming sulphuric acid ("oleum," 20–80%) and chlorosulfonic acid are examples of products of the latter type which will form compounds with the phosphorus compound similar to that formed by sulfur trioxide but differing from that formed by ordinary sulphuric acid, and which act like sulfur trioxide-phosphorus complexes in sulfation and sulfonation reactions. For the purposes of the present invention, compounds containing sulfur trioxide in loosely bound form may be considered equivalents of sulfur trioxide although the products may differ in some respect.

The following examples illustrate how the sulfating and sulfonating agents of the present invention may be prepared.

*Example 1*

To 6.1 grams (0.033 mole) of triethyl phosphate dissolved in 200 cc. of dichloroethane was added 4.16 cc. (0.10 mole) of sulfur trioxide in a dropwise manner over a 2 minute period with stirring. The temperature of the triethyl phosphate solution rose from 25° C. to 32° C. and the solution which was originally clear became light yellow in color. Upon completion of the reaction, the temperature of the reaction product was permitted to come to room temperature (ca. 25° C.) and thereafter the dichloroethane solvent was removed by reducing the pressure to 10 mm. of mercury absolute pressure. The final portion of solvent was removed by warming the solution to 40° C. for 15 minutes under the aforementioned pressure. A yellow brown syrupy liquid was recovered which contained some solvent as evidenced by its odor. A portion of the reaction product was added to octyl alcohol and the temperature of the mixture increased several degrees. The sulfated alcohol was soluble in water as opposed to the insoluble characteristic of the corresponding alcohol and it foamed when shaken. Pure sulfur trioxide would have caused charring if contacted with alcohol under the same conditions. Another portion of the complexed product was added to a 2 wt. percent solution of polystyrene in dichloroethane. This caused the polystyrene solution to gel at first and then the sulfonated polystyrene precipitated from the dichloroethane solvent.

*Example 2*

To 5.5 grams (0.033 mole) of triethyl phosphite, dissolved in 250 cc. of dichloroethane, was added 4.16 cc. (0.1 mole) of sulfur trioxide over a 2 minute period with stirring. It was noted that the temperature of the solution rose from 25° C. to 45° C. during the addition of the sulfur trioxide. The colorless reaction solution was admixed with 2 wt. percent polystyrene in dichloroethane at −5° C. and the sulfonated polymer precipitated from the solution. The sulfonated polystyrene produced was soluble in methanol and contained 14.5% combined sulfur.

*Example 3*

To 0.033 mole of triethyl phosphate dissolved in 260 cc. of dichloroethane is added 0.1 mole of chlorosulfonic acid with stirring. The resulting complex is suitable for use as a sulfonating agent.

*Example 4*

To 0.033 mole of tetrabutyl pyrophosphate in 260 cc. of dichloroethane is added 0.066 mole of sulfur trioxide with stirring. The resulting complex is suitable for use as a sulfating agent.

*Example 5*

To 0.033 mole of dipropyl hydrogen phosphate in 260 cc. of dichloroethane is added 0.033 mole of sulfur trioxide with stirring. The resulting complex is suitable as a sulfating agent.

*Example 6*

To 0.033 mole of dimethyl hydrogen phosphite in 260 cc. of dichloroethane is aded 0.1 mole of sulfur trioxide with stirring. The resulting complex is suitable as a sulfonating agent.

Resort may be had to various modifications and variations of the present invention without departing from the spirit of the discovery or the scope of the appended claims.

What is claimed is:

1. A process for the production of compositions of matter which comprises combining a substance containing available sulfur trioxide selected from the group consisting of sulfur trioxide, chlorosulfonic acid and oleum with less than an equimolar amount, based on available sulfur trioxide, of an organic phosphorus compound selected from the group consisting of pentavalent phosphorus compounds containing a phosphoryl function and trivalent phosphorus compounds containing a free electron pair function, said composition constituting a sulfur trioxide-phosphorus compound complex containing from one to twelve moles of sulfur trioxide per mol of phosphorus compound which complex is capable of sulfating and sulfonating organic compounds at temperatures up to about 100° C. without charring.

2. The process as defined in claim 1 in which the substance containing available sulfur trioxide and the phosphorus compound are contacted at temperatures of from −20° C. to 100° C.

3. A process for the production of compositions of matter which comprises combining a substance containing available sulfur trioxide selected from the group consisting of sulfur trioxide, chlorosulfonic acid and oleum with less than an equimolar amount, based on available sulfur trioxide, of an organic phosphorus compound selected from the group consisting of pentavalent phosphorus compounds containing a phosphoryl function and trivalent phosphorus compounds containing a free electron pair function at temperatures of about −5° C. to about +40° C. in the presence of an inert solvent, said composition constituting a sulfur trioxide-phosphorus compound complex containing from one to twelve moles of sulfur trioxide per mol of phosphorus compound which complex is capable of sulfating and sulfonating organic compounds at temperatures up to about 100° C. without charring.

4. The process as defined in claim 3 in which the organic phosphorus compound contains up to three alkyl groups each of which alkyl groups contains 1 to 18 carbon atoms.

5. The process as defined in claim 3 in which the organic phosphorus compound is a trialkyl phosphate wherein each alkyl group contains 1 to 18 carbon atoms.

6. The process as defined in claim 3 in which the organic phosphorus compound is a trialkyl phosphite wherein each alkyl group contains 1 to 18 carbon atoms.

7. A process for the production of compositions of matter which comprises combining sulfur trioxide with less than an equimolar amount of an organic phosphorus compound selected from the group consisting of pentavalent phosphorus compounds containing a phosphoryl function and trivalent phosphorus compounds containing a free electron pair function, said composition constituting a sulfur trioxide-phosphorus compound complex containing from one to twelve moles of sulfur trioxide per mol of phosphorus compound which complex is capable of sulfating and sulfonating organic compounds at temperatures up to about 100° C. without charring.

8. The process as defined in claim 7 in which the sulfur trioxide and organic phosphorus compound are contacted at temperatures of from −20 to 100° C.

9. A process for the production of compositions of matter which comprises combining sulfur trioxide with less than an equimolar amount of an organic phosphorus compound selected from the group consisting of pentavalent phosphorus compounds containing a phosphoryl function and trivalent phosphorus compounds containing a free electron pair function, at temperatures of about −5 to about +40° C. in the presence of an inert solvent, said composition constituting a sulfur trioxide-phosphorus compound complex containing from one to twelve moles of sulfur trioxide per mol of phosphorus compound which complex is capable of sulfating and sulfonating organic compounds at temperatures up to about 100° C. without charring.

10. The process as defined in claim 9 in which the organic phosphorus compound contains up to three alkyl groups each of which alkyl groups contains 1 to 18 carbon atoms.

11. The process as defined in claim 9 in which the organic phosphorus compound is a trialkyl phosphate wherein each alkyl group contains 1 to 18 carbon atoms.

12. The process as defined in claim 9 in which the organic phosphorus compound is a trialkyl phosphite wherein each alkyl group contains 1 to 18 carbon atoms.

13. A composition of matter consisting essentially of a combination of sulfur trioxide derived from a member of the group consisting of sulfur trioxide, chlorosulfonic acid and oleum with an organic phosphorus compound selected from the group consisting of pentavalent phosphorus compounds containing a phosphoryl function and trivalent phosphorus compounds containing a free electron pair function, said composition constituting a sulfur trioxide-phosphorus compound complex containing from one to twelve moles of sulfur trioxide per mole of phosphorus compound which complex is capable of sulfating and sulfonating organic compounds at temperatures up to about 100° C. without charring.

14. Compositions as defined in claim 13 in which the organic phosphorus compound is a pentavalent phosphorus compound containing a phoshoryl function and at least one ester oxygen function.

15. Compositions as defined in claim 13 in which the organic phosphorus compound contains up to three alkyl groups each of which alkyl groups contains 1 to 18 carbon atoms.

16. Compositions as defined in claim 13 in which the organic phosphorus compound is a trialkyl phosphate wherein each alkyl group contains 1 to 18 carbon atoms.

17. Compositions as defined in claim 13 in which the organic phosphorus compound is a trialkyl phosphate wherein each alkyl group contains 1 to 18 carbon atoms.

18. A composition of matter consisting essentially of the reaction product of sulfur trioxide with an organic phosphorus compound selected from the group consisting of pentavalent phosphorus compounds containing a phosphoryl function and trivalent phosphorus compounds containing a free electron pair function, said reaction product constituting a sulfur trioxide-phosphorus compound complex containing from one to twelve moles of sulfur trioxide per mole of phosphorus compound which complex is capable of sulfating and sulfonating organic compounds at temperatures of up to about 100° C. without charring.

19. Compositions as defined in claim 18 in which the organic phosphorus compound is a pentavalent phosphorus compound containing a phosphoryl function and at least one ester oxygen function.

20. Compositions as defined in claim 18 in which the organic phosphorus compound contains up to three alkyl groups each of which alkyl groups contains 1 to 18 carbon atoms.

21. Compositions as defined in claim 18 in which the organic phosphorus compound is a trialkyl phosphate wherein each alkyl group contains 1 to 18 carbon atoms.

22. Compositions as defined in claim 18 in which the organic phosphorus compound is a trialkyl phosphite wherein each alkyl group contains 1 to 18 carbon atoms.

23. A composition of matter consisting essentially of the reaction product of sulfur trioxide with a trialkyl phosphate wherein each alkyl group contains 1 to 18 carbon atoms, said reaction product constituting a sulfur trioxidetrialkyl phosphate complex containing two to four moles of sulfur trioxide per mole of trialkyl phosphate which complex is capable of sulfating and sulfonating organic compounds at temperatures of up to about 100° C. without charring.

24. Compositions as defined in claim 23 in which the trialkylphosphate is triethyl phosphate.

References Cited in the file of this patent

UNITED STATES PATENTS

| | | |
|---|---|---|
| 571,530 | Langhans | Nov. 17, 1896 |
| 1,896,725 | Tanner | Feb. 7, 1933 |
| 2,059,084 | Buchheim | Oct. 27, 1936 |
| 2,872,290 | Blanchard | Feb. 3, 1959 |

FOREIGN PATENTS

| | | |
|---|---|---|
| 767,153 | Germany | Jan. 31, 1952 |
| 542,370 | Italy | Apr. 21, 1956 |
| 956,404 | Germany | Jan. 17, 1957 |

OTHER REFERENCES

Michalski et al.: Che. Abstracts, 49, 9487c (1955).
Mellor; Comprehensive Treatise of Theoretical and Inorganic Chemistry, vol. 10, page 346.